H. J. CORDESMAN, Jr.
Saw-Gummer.
No. 160,395.
Patented March 2, 1875.
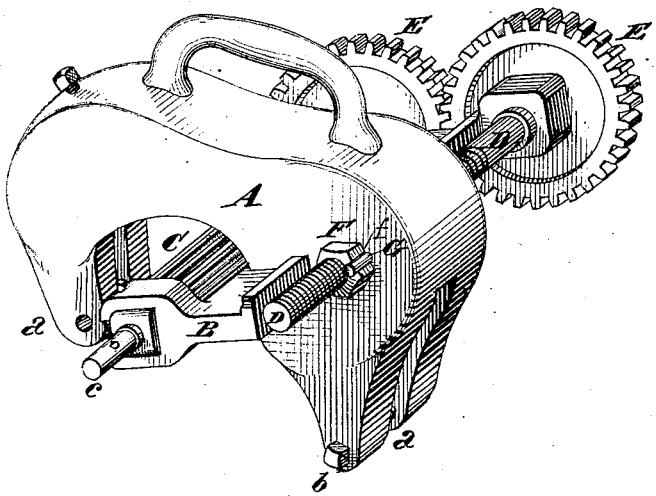
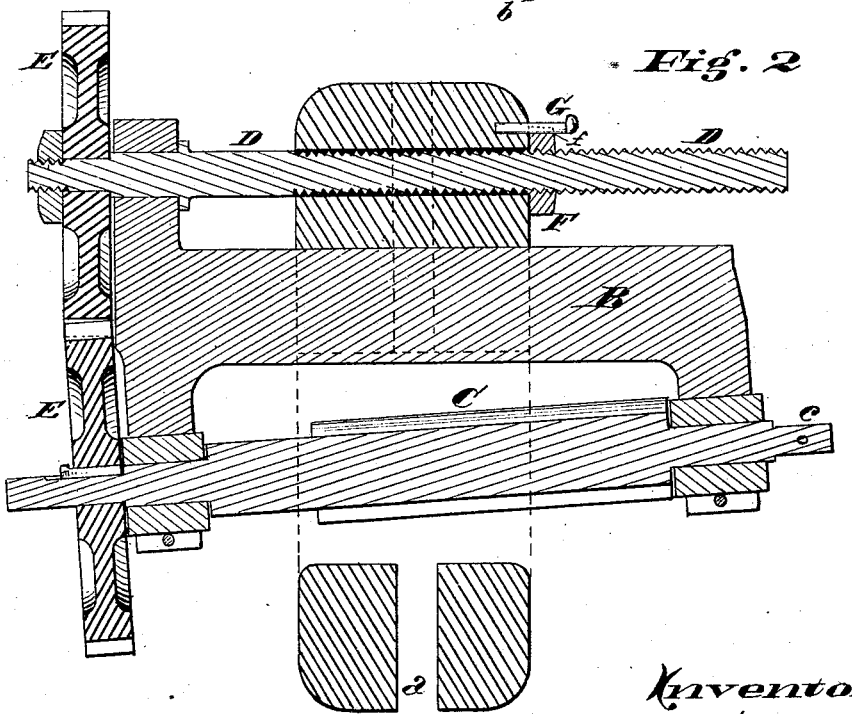

UNITED STATES PATENT OFFICE.

HENRY J. CORDESMAN, JR., OF CINCINNATI, OHIO, ASSIGNOR TO JAMES P. ALLEY, OF SAME PLACE.

IMPROVEMENT IN SAW-GUMMERS.

Specification forming part of Letters Patent No. 160,395, dated March 2, 1875; application filed February 16, 1874.

*To all whom it may concern:*

Be it known that I, HENRY J. CORDESMAN, Jr., of Cincinnati, Hamilton county, State of Ohio, have invented a certain new and useful Improvement in Saw-Gummers, of which the following is a specification:

My invention relates to the style or kind of saw-gummer which has a grooved cutter rotated by a hand-crank and fed to the hollow of the tooth by an inclined slide and feed-screw, the screw being operated by gearing from the cutter.

Heretofore this instrument or tool has been so constructed that when the cutter has been fed to the fullest extent into the work it has been necessary to turn the cutter, gearing, and screw backward in order to take the slide and cutter back to the place of beginning preparatory to the gumming of the next tooth.

In order to avoid this inconvenience and loss of time my improvement is designed; and it consists simply in the provision of a nut for the feed-screw, which nut, when the screw is in the act of feeding, shall, by the assistance of the detachable pin, be held stationary, and, when the screw, tool, and slide require backing, shall be entirely released by the withdrawal of the pin, so that it (the nut) can be spun or run back by the fingers rapidly, and thus permit the backing of the cutter with great convenience and rapidity.

Figure 1 is a perspective view of a saw-gummer embodying my invention. Fig. 2 is an axial section of the same.

A is the case of the gummer, which has the slotted ends $a$ to fit over the edge of the saw, and set-screws $b$ to confine it in place. The slide B, which carries the cutter C in suitable journals, is fitted into a T-headed groove in the case, and is, as shown in Fig. 2, inclined to the axis of the cutter, so that as the cutter is moved toward the saw it cuts deeper into the hollow of the tooth. The cutter is rotated by a hand-crank placed on the end $c$ of the cutter, and it is fed to the work by means of the feed-screw D, which is connected to the cutter by means of gear-wheels E E. To this feed-screw I fit an ordinary nut, F, which is so loosely fitted that it can be spun or run up rapidly by the fingers. This nut has a notch or groove, $f$, cut in it for the reception of the pin G, which is fitted into the case A in the manner shown, so as to hold the nut from turning when the screw is in the act of feeding.

When it is required to back the cutter the pin is removed or the cutter rotated backward so far as to clear the nut from contact with the pin, and the nut may then be spun back the entire length of the screw with great rapidity, so as to permit the slide, feed-screw, and cutter to go back without obstruction preparatory to the starting of the cut in the next tooth.

I claim—

In combination with a saw-gummer constructed substantially as described, the loose nut F $f$ and pin G, operating substantially in the manner and for the purpose specified.

In testimony of which invention I hereunto set my hand.

H. J. CORDESMAN, JR.

Witnesses:
J. L. WARTMANN,
R. M. HUNTER.